United States Patent [19]

Doi

[11] Patent Number: 5,077,668
[45] Date of Patent: Dec. 31, 1991

[54] METHOD AND APPARATUS FOR PRODUCING AN ABSTRACT OF A DOCUMENT

[75] Inventor: Miwako Doi, Kawasaki, Japan

[73] Assignee: Kabushiki Kaisha Toshiba, Kawasaki, Japan

[21] Appl. No.: 413,605

[22] Filed: Sep. 28, 1989

[30] Foreign Application Priority Data

Sep. 30, 1988 [JP] Japan ............................ 63-245967

[51] Int. Cl.$^5$ ............................ G06F 7/38; G06F 7/6
[52] U.S. Cl. .................................................. 364/419
[58] Field of Search ......................................... 364/419

[56] References Cited
FOREIGN PATENT DOCUMENTS 1-273164 11/1989 Japan .
2-257266 10/1990 Japan .

OTHER PUBLICATIONS

Luhn, "The Automatic Creation of Literature Abstracts"; IBM Journal, Apr. 1958, pp. 159-165.
Fum et al., "Evaluating Importance: A Step Towards Text Summarization", IJCAI85, 1985, pp. 840-844.

Primary Examiner—Dale M. Shaw
Assistant Examiner—Laura Brutman
Attorney, Agent, or Firm—Foley & Lardner

[57] ABSTRACT

A method and an apparatus for producing an abstract of a document capable of producing concise abstract with correct meaning precisely indicative of the content of the document automatically. The method includes the steps of: listing hint words which are preselected words indicative of presence of significant phrases that can reflect content of the document; searching all the hint words in the document; extracting sentences of the document in which any one of the listed hint words is found by the search; and producing an abstract for the document by juxtaposing the extracted sentences. An apparatus for performing this method is also disclosed.

10 Claims, 14 Drawing Sheets

FIG.2

| SENTENCE NO. | |
|---|---|
| 1 | VOICE—CONTROLLABLE WRIST WATCH |
| 2 | TADASHI SATO |
| 3 | ○○ CLOCK.CO. |
| 4 | 1. INTRODUCTION |
| 5 | A WRIST WATCH NOWADAYS TENDS TO INCORPORATE VARIOUS EXTRA FUNCTIONS SUCH AS A MEMO—FUNCTION IN ADDITION TO THE CONVENTIONAL FUNCTIONS. |
| 6 | HOWEVER,IT HAS BEEN POINTED OUT THAT ---- |
| 7 | THIS IS BECAUSE IT IS NECESSARY TO ---- |
| 8 | IN A VOICE—CONTROLLABEL WRIST WATCH DEVELOPED THIS TIME,ALL THE OPERATIONS BY SWITCHES IN A CONVENTIONAL WRIST WATCH HAVE BEEN REPLACED BY THE OPERATIONS BY HUMAN VOICE |
| 23 | 2. METHOD OF RECOGNITION |
| 24 | FOR THE METHOD OF RECOGNITION,THERE IS ---- |

FIG.3

| CATEGORIES | HINT WORDS | PART OF SPEECH |
|---|---|---|
| DEVELOPMENT | DEVELOP | V |
|  | REALIZE | V |
|  | UTILIZE | V |
|  | PRODUCE | V |
|  | SELL | V |
|  | ⋮ | ⋮ |
| STATUS | PROBLEM | N |
|  | SOLVE | V |
|  | REQUIRE | V |
|  | ⋮ | ⋮ |
| METHOD | METHOD | N |
|  | ⋮ | ⋮ |
| ⋮ | ⋮ | ⋮ |

FIG.4 (A)

| SENTENCE NO. | |
|---|---|
| 1 | VOICE—CONTROLLABLE WRIST WATCH |
| 2 | TADASHI SATO |
| 3 | CLOCK.CO. |
| 4 | 1. INTRODUCTION |
| 5 | A WRIST WATCH NOWADAYS TENDS TO INCORPORATE VARIOUS EXTRA FUNCTIONS SUCH AS A MEMO—FUNCTION IN ADDITION TO THE CONVENTIONAL FUNCTIONS. |
| 23 | 2. METHOD OF RECOGNITION |
| 24 | FOR --- |

ABSTRACT

A WRIST WATCH NOWADAYS TENDS TO INCORPORATE VARIOUS EXTRA FUNCTIONS SUCH AS A MEMO—FUNCTION IN ADDITION TO THE CONVENTIONAL FUNCTIONS.

IN A VOICE CONTROLLABLE WRIST WATCH DEVELOPED THIS TIME, ALL THE OPERATIONS BY SWITCHES IN A CONVENTIONAL WRIST WATCH HAVE BEEN REPLACED BY THE OPERATIONS BY HUMAN VOICE.

2. METHOD OF RECOGNITION

FOR THE METHOD OF RECOGNITION, THERE IS ---

FIG.4 (B)

| | ABSTRACT |
|---|---|
| 5 | A WRIST WATCH NOWADAYS TENDS TO ~~INCORPORATE~~ VARIOUS EXTRA ~~FUNCTIONS~~ SUCH AS A MEMO—~~FUNCTION~~ IN ADDITION TO THE ~~CONVENTIONAL FUNCTIONS~~. |
| 8 | IN A VOICE CONTROLLABLE WRIST WATCH ~~DEVELOPED~~ ~~THIS TIME~~, ALL THE ~~OPERATIONS~~ BY SWITCHES IN A ~~CONVENTIONAL~~ WRIST WATCH HAVE BEEN REPLACED BY THE ~~OPERATIONS~~ BY HUMAN VOICE. |
| 23 | 2. ~~METHOD~~ OF RECOGNITION |
| 24 | FOR THE ~~METHOD~~ OF RECOGNITION, THERE IS -------------- |

FIG.6

| SENTENCE NO. | ATTRIBUTE | ORDER | LEVEL |
|:---:|:---:|:---:|:---:|
| 1 | TITLE | | 1 |
| 2 | AUTHOR | | 1 |
| 3 | AFFILIATION | | 1 |
| 4 | CHAPTER HEADER | 1 | 1 |
| 5 | PARAGRAPH | | 2 |
| 6 | PARAGRAPH | | 2 |
| 7 | PARAGRAPH | | 2 |
| 8 | PARAGRAPH | | 2 |
| ⋮ | ⋮ | | ⋮ |
| 23 | CHAPTER HEADER | 2 | 1 |
| 24 | PARAGRAPH | | 2 |
| ⋮ | ⋮ | | ⋮ |

FIG.7
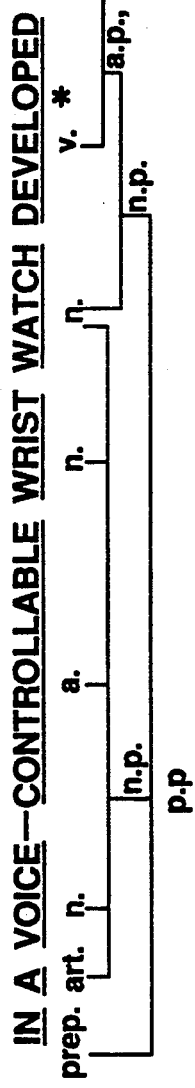
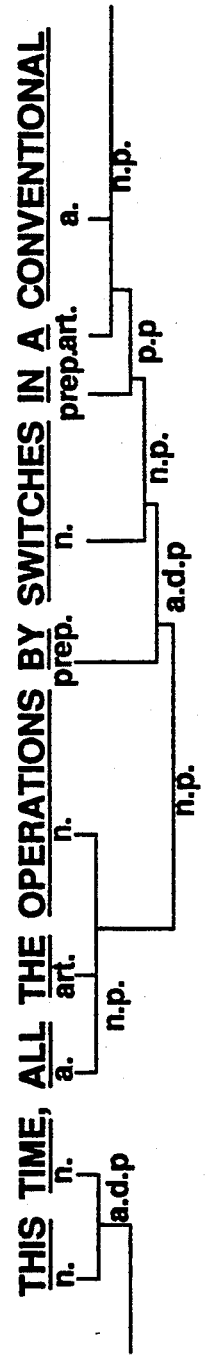
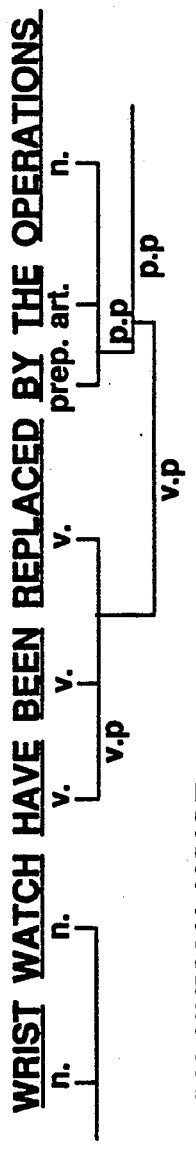
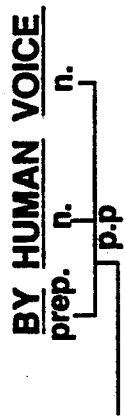
art. = article
prep. = preposition
n. = noun
v. = verb
a. = adjective
ad. = adverb
p. = phrase

FIG.8 (A)

```
ABSTRACT (EXTRACTED SENTENCES)
    VOICE—CONTROLLABLE WRIST WATCH
    TADASHI SATO
    ∞ CLOCK,CO
    IN A VOICE—CONTROLLABLE WRIST WATCH DEVELOPED
THIS TIME, ALL THE OPERATIONS BY SWITCHES IN A CONVENTIONAL
WRIST WATCH HAVE BEEN REPLACED BY THE OPERATIONS
BY HUMAN VOICE.

FOR THE METHOD OF RECOGNITION, THERE IS----
-----
```

FIG.8 (B)

```
ABSTRACT (PRODUCED)

∞CLOCK CO. DEVELOPED A VOICE—CONTROLLABLE
      WRIST WATCH THAT CAN BE OPERATED BY
      HUMAN VOICE.
```

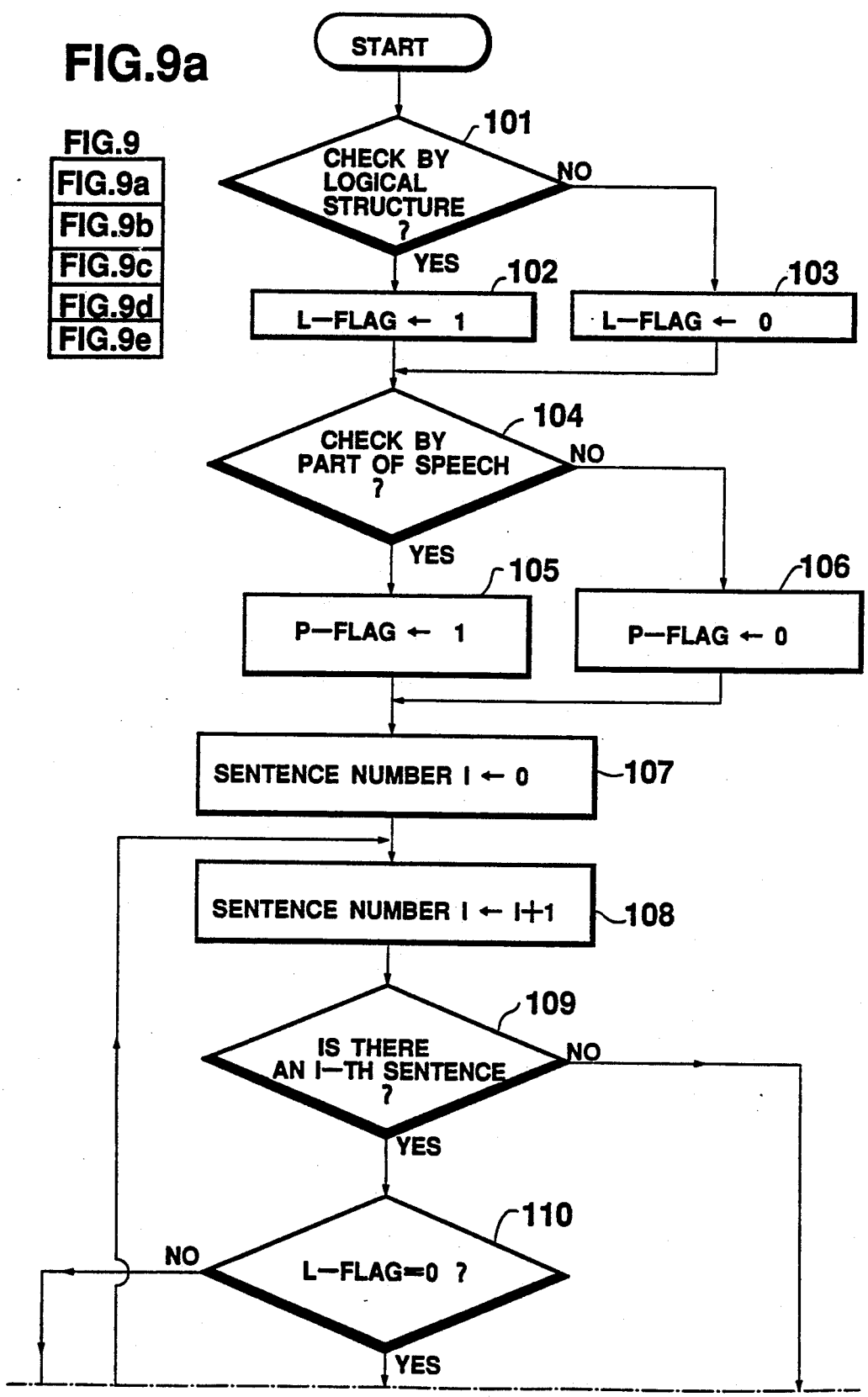

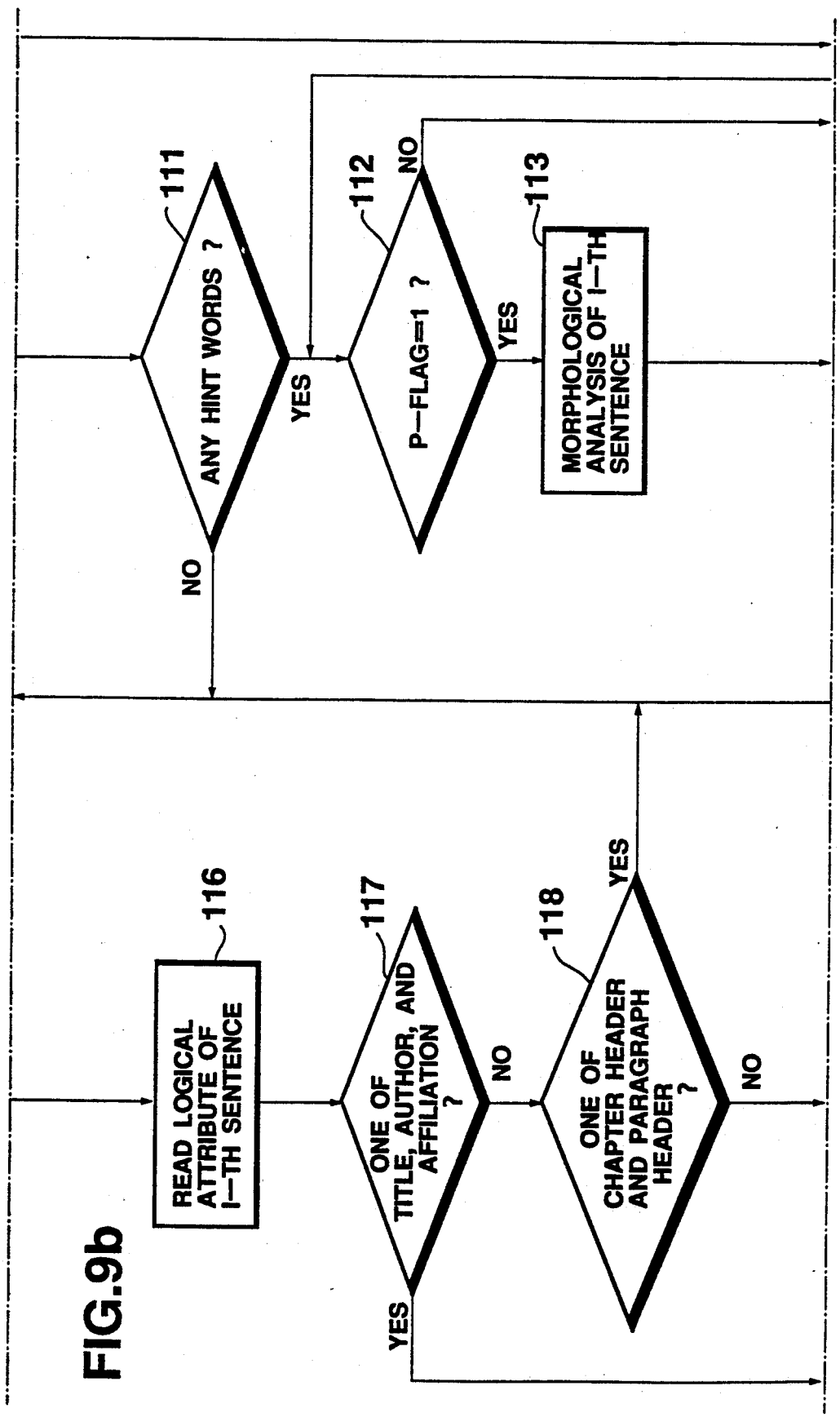

FIG.9c

- 114: PART OF SPEECH OF HINT WORD COINCIDE WITH THAT IN HINT WORD DICTIONARY ? (NO / YES)
- 115: EXTRACTING I—TH SENTENCE
- 119: I—TH SENTENCE IN ONE OF 1ST. CHAPTER AND SUMMARY ? (YES / NO)
- 120: ANY HINT WORDS OF CATEGORIES 'DEVELOPMENT' AND 'STATUS' ? (NO / YES)
- 121: ANY HINT WORDS NOT OF CATEGORIES 'DEVELOPMENT' OR 'STATUS' ? (NO / YES)

METHOD AND APPARATUS FOR PRODUCING AN ABSTRACT OF A DOCUMENT

BACKGROUND OF THE INVENTION

1. Field of the Invention

The present invention relates to a method and an apparatus for producing an abstract of a document from given document data.

2. Description of the Background Art

In recent years, it has become fashionable to store a large amount of technical documents such as patent documents as files in a database. In such a database system, key words characterizing particular technical fields for each documents are also registered for the sake of document search.

However, in general, such key words alone are not sufficient to properly characterize documents. For this reason, it appears desirable to have a concise abstract summarizing each document for every one of the large amount of documents, but the number of the document usually defies practical implementation.

As a solution, there has been propositions for an automatic production of abstracts using a computer.

In one of such propositions made by H. P. Luhn in "The Autonmatic Creation of Literature Abstracts" IBM J. Res. Dev. Vol. 2, pp. 159-165, sentences in a document which contains words that appears frequently in that document are extracted from the document as an abstract of the document. This method is based on an assumption that important words appear frequently in a document. However, frequently appearing words may not necessarily be precisely indicative of the content of the document, so that inappropriate abstracts are often obtained by this method. Moreover, the method has a drawback that, as the sentences with frequently appearing words are to be extracted, the number of sentences to be extracted also tends to become numerous, while a concise abstract is more desirable.

In another proposition made by D. Fun, et al. in "Step toward the evaluation of text" IJCAI85, pp. 840-844, an attempt has been made to evaluate the content of the document more properly so that an abstract with correct meaning can be obtained. However, the actual realization of such method still remains to be achieved.

Thus, conventionally, it has been difficult to produce abstracts automatically, so that production of the abstracts actually relied on human resources.

SUMMARY OF THE INVENTION

It is therefore an object of the present invention to provide a method and an apparatus for producing an abstract of a document capable of producing concise abstract with correct meaning precisely indicative of the content of the document automatically.

According to one aspect of the present invention there is provided a method of producing an abstract for a document, comprising the steps of: listing hint words which are preselected words indicative of presence of significant phrases that can reflect content of the document; searching all the hint words in the document; extracting sentences of the document in which any one of the listed hint words is found by the search; and producing an abstract for the document by juxtaposing the extracted sentences.

According to another aspect of the present invention there is provided an apparatus for producing an abstract for a document, comprising: means for listing hint words which are preselected words indicative of presence of significant phrases that can reflect content of the document; means for searching all the hint words in the document; means for extracting sentences of the document in which any one of the listed hint words is found by the search; and means for producing an abstract for the document by juxtaposing the extracted sentences.

Other features and advantages of the present invention will become apparent from the following description taken in conjunction with the accompanying drawings.

BRIEF DESCRIPTION OF THE DRAWINGS

FIG. 2 is an illustration of an example of a document for which an abstract is to be produced by the embodiment of FIG. 1.

FIG. 3 is a diagrammatic illustration of a hint word dictionary to be used by the embodiment of FIG. 1.

FIGS. 4(A) and (B) are illustrations of the abstract produced by the embodiment of FIG. 1 at two different stage of producing the abstract.

FIG. 6 is a diagrammatic illustration of a logical structure memory to be used by the embodiment of FIG. 5.

FIG. 7 is an exemplary result of morphological analysis to be used by the embodiment of FIG. 5.

FIGS. 8(A) and (B) are illustrations of the abstract produced by the embodiment of FIG. 1 at two different stage of producing the abstract.

DETAILED DESCRIPTION OF THE PREFERRED EMBODIMENTS

Figure 1:
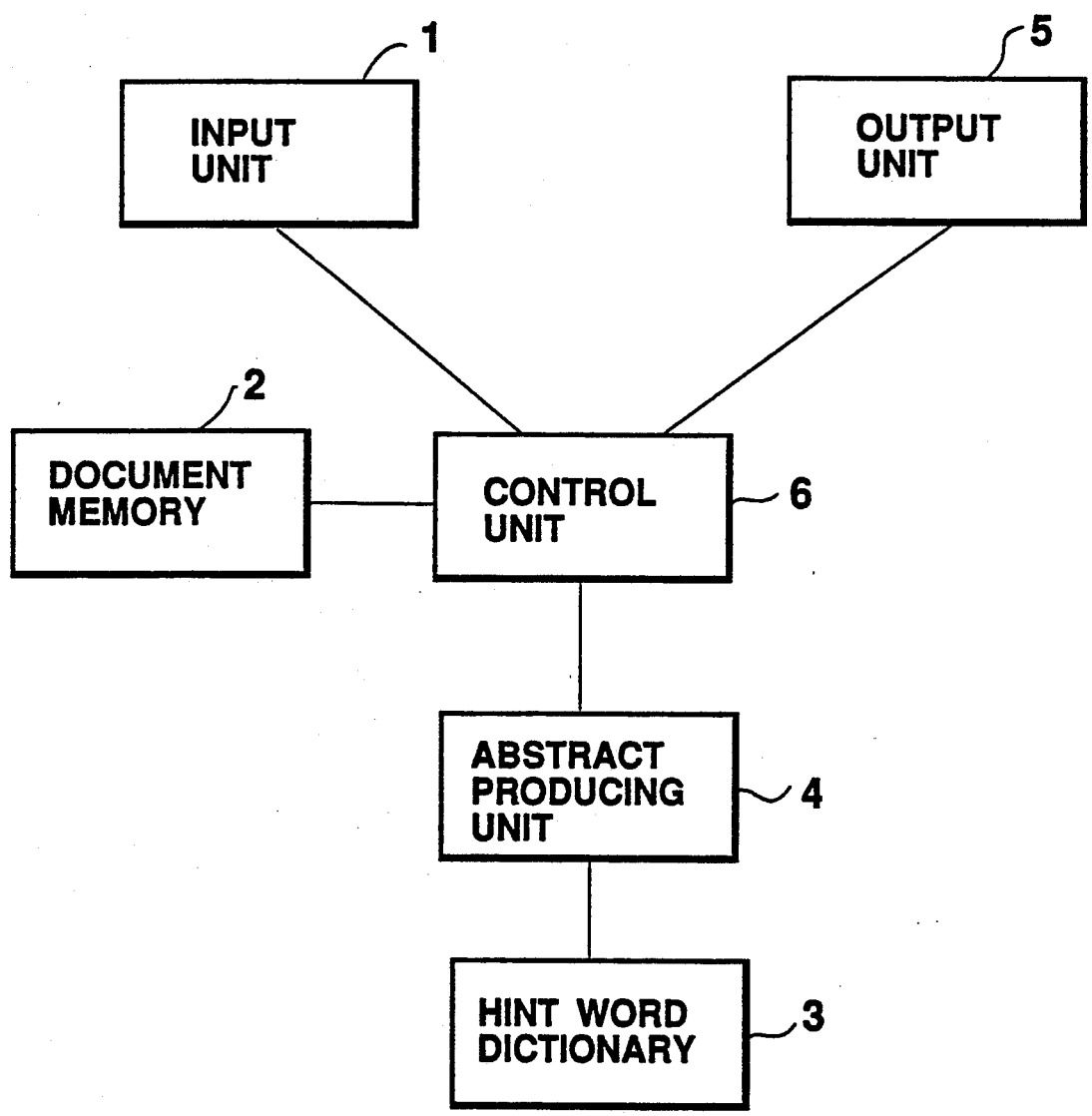
FIG. 1 is a block diagram of one embodiment of an apparatus for producing an abstract for a document according to the present invention.

Referring now to FIG. 1, there is shown one embodiment of an apparatus for producing an abstract of a document according to the present invention.

In this embodiment, the apparatus comprises an input unit 1 from which document data and operator commands are to be entered, a document memory 2 for storing document data entered from the input unit 1, a hint word dictionary 3 for storing hint words, which are preselected words indicative of presence of significant phrases that can reflect content of the document data, an abstract producing unit 4 for producing an abstract of the document data by extracting sentences containing the hint words and combining the extracted sentences in a manner to be explained in detail below, an output unit 5 for displaying and printing the produced abstract along with the document data, and a control unit 6 for coordinating operations of the above mentioned elements of the apparatus.

In this apparatus, the document data entered from the input unit 1 will be given to the control unit 6, and then temporarily stored in the document memory 2, and at the same time displayed at the output unit 5, as shown for an exemplary document in FIG. 2. Here, the document data are displayed in unit of sentence which are labeled by sentence numbers, but this manner of displaying is not essential to the present invention.

Meanwhile, as mentioned above, the hint word dictionary 3 stores the hint words which are preselected words indicative of presence of significant phrases that can reflect content of the document data, in a manner shown in FIG. 3 for some examples of the hint words. As can be seen from FIG. 3, the hint words are grouped into a number of general categories such as 'development', 'status', and 'method', with numbers of hint words belonging to each category. In addition, for each hint word, a part of speech to be given a higher priority over other part of speeches as a usage of that hint word is also given. For instance, a hint word 'develop' may arise as a verb 'develop' (or a part of its conjugations) or as a part of noun 'development'. Here, the usage as a verb 'develop' is to be given a higher priority as it is considered to be more indicative of presence of significant phrases that can reflect content of the document data. Accordingly, a symbol 'V' is entered in a part of speech column for the hint word 'develop'. Likewise, for those hint words for which the usage as a noun is to be given a higher priority, a symbol 'N' is given. Again, a particular manner of storing hint words shown in FIG. 3 is only meant to be an example and not essential to the present invention.

Now, the operation of abstract producing is carried out as follows.

First of all, when a command for production of abstract is entered from the input unit 1, the abstract producing unit 4 will be activated by the control unit 6, and the production of abstract begins with reading of the document data stored in the document memory 2 by the abstract producing unit 4.

Next, the abstract producing unit 4 carries out searches of the hint words stored in the hint word dictionary 3 in the document data, and extracts all the sentences in the document data which involves any one of the hint words. The abstract producing unit 4 then produces an abstract by juxtaposing all the extracted sentences.

The abstract so produced will then be transmitted through the control unit 6 to the output unit 5, at which it will be displayed, over the document data as shown in FIG. 4(A), for example.

At this point, if desired, a command for indicating information concerning these extracted sentences can be provided. When this command is given from the input unit 1, shades will be overlaid on the hint words used in extracting these extracted sentences, and the sentence numbers of these extracted sentences are displayed, as shown in FIG. 4(B), so that an operator may perform editing of the produced abstract. For instance, when one of the extracted sentences in the abstract is considered unnecessary by the operator, that sentence may be deleted from the abstract. Such editing by an operator can be facilitated in any known manner.

The abstract thus produced may further be stored either as a part of the document data or as a separate data.

Thus, according to this embodiment, it is possible to produce a concise abstract of a document with a correct meaning precisely indicative of the content of the document automatically, as the abstract is produced from sentences in the document extracted by means of the hint words which are preselected words indicative of presence of significant phrases that can reflect content of the document data.

Here, it is preferable to further facilitate registration of new hint words to the hint word dictionary 3 by an operator, partly for a case in which no sentence gets extracted by the abstract producing unit 4 as a number of the hint words in the hint word dictionary 3 is insufficient, and partly also because the desirable hint words may be different for different operators.

Now, in the above embodiment, when the registration of new hint words is facilitated, the number of sentences to be extracted increases as the number of new hint words registered by the operator increases such that the produced abstract may become rather lengthy, which will weaken an effectiveness of the present invention.

Figure 5:
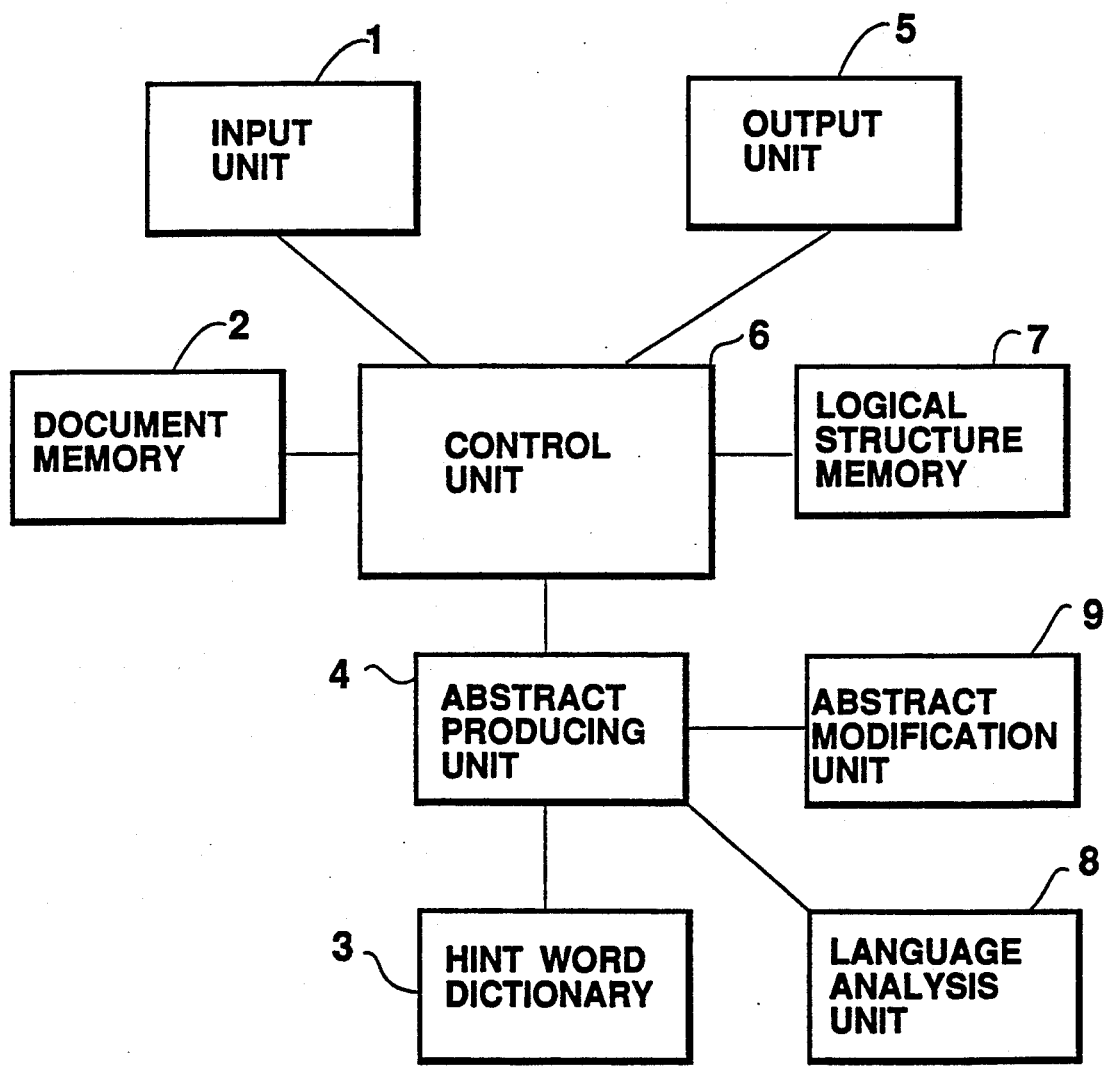
FIG. 5 is a block diagram of another embodiment of an apparatus for producing an abstract for a document according to the present invention.

This drawback is rectified in another embodiment of an apparatus for producing an abstract of a document according to the present invention, shown in FIG. 5. In FIG. 5, those elements of the apparatus which are equivalent to corresponding elements in the previous embodiment of FIG. 1 are labeled by the same reference numerals, and their explanations will not be repeated below.

In this embodiment, the apparatus of the previous embodiment is further equipped with a logical structure memory 7 for storing logical structure of the document data which is either entered from the input unit 1 or extracted from the document data, a language analysis unit 8 for performing morphological analysis of the extracted sentences in the abstract produced by the abstract producing unit 4, and an abstract modification unit 8 for modifying the abstract produced by the abstract producing unit 4 in a manner to be explained below.

The logical structure memory 7 stores structural attribute of each sentence of the abstract, indicating such structures as a title, a summary, chapters, paragraphs etc., as shown in FIG. 6, for example. In FIG. 6, order and level labels are also included in order to indicate hierarchical structure, although this feature is not essential to the present invention. Such logical structure may either be obtained by using any known method of analyzing logical structure of a document such as that utilizing shapes of a document, or entered from the input unit 1 by an operator.

These information in the logical structure memory 7 will be utilized by the abstract producing unit 4 in carrying out the search of the hint words as follows. For instance, the hint words belonging to the categories such as 'development' or 'status' are more likely to appear in a summarizing part of the document, such as a summary section or an introduction section which is more likely to be in a first chapter, whereas the hint words belonging to the categories of more detailed nature such as 'method' are more likely to appear in chapters after the first chapter. Taking these as assumptions, the search of the hint words belonging to the categories such as 'development' or 'status' will be carried out only for the first chapter, i.e., the sentence No. 5 to No. 22 in an example shown in FIG. 6, and the hint words belonging to the categories such as 'method' will be carried out only for the second chapter on, i.e., after the sentence No. 24 in an example shown in FIG. 6. Furthermore, the sentence No. 4 and No. 23 will be omitted from a region for search as they are chapter header, which are clearly unnecessary in the abstract.

On the other hand, the sentences extracted by the abstract producing unit 4 are given to the language analysis unit 8, at which the morphological analysis is performed on these extracted sentences. The morphological analysis to be performed can be done by any one of the known methods for such analysis. As an example, a result of a morphological analysis for the sentence No. 8 is shown in FIG. 7. The abstract producing unit 4 then compares a part of speech for each hint word obtained by the morphological analysis with one listed in the hint word dictionary 3 for that hint word, mark the hint word with a right part of speech such as 'develop' in FIG. 7 with an asterisk, and retains only those sentences which involves a hint word with a right part of speech. This manner of selection among the extracted sentences can alternatively be done by giving five points to those hint words with a specified type of part of speech, one points to those hint words with a part of speech other than the specified type, and retaining only such sentence which has a total sum of points given to all the hint words involved in that sentence exceeding a predetermined points. In addition, in this embodiment, the abstract producing unit 4 also extracts a sentence No. 1 which is a title sentence, sentence No. 2 which is an author sentence, and sentence No. 3 which is an affiliation sentence. Thus, the extracted sentences will appear as shown in FIG. 8(A), for example.

Then, when a command for abstract modification is given from the input unit 1, remaining extracted sentences are given to the abstract modification unit 9, in which sentences involving hint words with asterisk marking will be modified as follows. Namely, for a hint word with asterisk marking whose part of speech is a verb, a new sentence in which that hint word appears as a predicate will be created and replaces the original extracted sentence. In addition, when a subject of this hint word which is a verb is a pronoun or missing, entry of the affiliation sentence will be substituted for that pronoun to produce more comprehensive sentence. On the other hand, for a hint word with asterisk marking whose part of speech is an adjective, a new sentence in which that hint word appears as a subject will be created and replaces the original extracted sentence. Thus, the resulting abstract produces appears as shown in FIG. 8(B).

More systematically, this operation of producing abstract proceeds, according to the flow chart of FIG. 9, as follows.

At the step 101, a command regarding whether to perform checking by the logical structure using the logical structure memory 7 is given by the operator from the input unit 1. If yes, then an L-flag is set to 1 at the step 102, otherwise the L-flag is set to 0 at the step 103.

Then at the step 104, a command regarding whether to perform checking by the part of speech using the language analysis unit 8 is given by the operator from the input unit 1. If yes, then an P-flag is set to 1 at the step 105, otherwise the P-flag is set to 0 at the step 106.

Then at the step 107, the sentence number I is set to 0, is increased by 1 at the step 108.

Next, at the step 109, whether there is an I-th sentence in the document is determined. If yes, whether L-flag is 0 or not is evaluated at the step 110 next, otherwise the process proceeds to the step 122 to be explained below.

When the L-flag is found to be 0 at the step 110, a search of the hint words in the hint word dictionary 3 in the I-th sentence is carried out at the step 111, otherwise, the process proceeds to the step 116 to be explained below.

When at least one of the hint words is found at the step 111, whether P-flag is 1 or not is determined at the step 112, otherwise the process goes to the step 115 to be explained below.

When the P-flag is found to be 1 at the step 112, the morphological analysis of the I-th sentence is carried out by the language analysis unit 8 at the step 113, and then the part of speech of each hint word found by the language analysis unit 8 is compared with the part of speech listed in the hint word dictionary 3 to determine whether they coincide with each other at the step 114. If yes, the I-th sentence is extracted as a part of the abstract at the step 115 and process returns to the step 108 above, otherwise the process simply returns to the step 108 above.

When the L-flag is found to be 1 at the step 110, the logical attribute of the I-th sentence stored in the logical structure memory 7 is read at the step 116 next, and whether this attribute for the I-th sentence is one of a title, author, and affiliation is determined at the step 117. If yes, the process returns to the step 115 above, otherwise whether this attribute for the I-th sentence is one of a chapter header and paragraph header is determined at the step 118.

When the attribute is found to be one of a chapter header and a paragraph header at the step 118, then process returns to the step 108 above, otherwise whether the I-th sentence is in one of the first chapter and summary is determined at the step 119.

When the I-th sentence is found to be in one of the first chapter and summary at the step 119, whether any hint word belonging to the categories of 'development' and 'status' is included in the I-th sentence is determined at the step 120, otherwise the process proceeds to the step 121 to be explained below. If any hint word belonging to the categories of 'development' and 'status' is found to be included in the I-th sentence at the step 120, the process returns to the step 108 above, otherwise the process returns to the step 112 above.

When the I-th sentence is found to be neither in the first chapter nor summary at the step 119, whether any hint word not belonging to the categories of 'development' and 'status' is included in the I-th sentence is determined at the step 121. If yes, the process returns to the step 112 above, otherwise the process returns to the step 108 above.

When the I-th sentence is not found in the document at the step 109, a command regarding whether to perform the abstract modification using the abstract modification unit 9 is given by the operator from the input unit 1. If yes, then an extracted sentence number J to be assigned to each of the extracted sentences is set to 0 at the step 123 and is increased by 1 at the step 124, otherwise the process terminates.

Then at the step 125, whether the J-th extracted sentence exists or not is determined at the step 125. If yes, whether the J-th extracted sentence contains any hint word whose part of speech is verb is determined at the step 126, otherwise the process terminates.

When the J-th extracted sentence is found to contain no hint word whose part of speech is verb at the step 126, the J-th extracted sentence is produced as a modified sentence to be a part of the abstract at the step 127, and the process returns to the step 124 above, otherwise whether the contained hint words whose parts of speech are verbs are predicates of the J-th extracted sentence or not is determined at the step 128. If yes, the process returns to the step 127 above, otherwise a passage or a phrase in the J-th extracted sentence that contains the hint words whose parts of the speech are verbs and which are not predicates is extracted and modified as a predicate for the J-th extracted sentence at the step 129.

Then, at the step 130, whether the subject of the J-th extracted sentence is a pronoun is determined. If no, the process proceeds to the step 132 to be explained below, otherwise a sentence with a logical attribute of 'affiliation' is taken as a subject for the J-th extracted sentence at the step 131 and the process proceeds to the step 132.

At the step 132, an original predicate of the J-th extracted sentence is converted into either one of adjective or adverb at the step 132, resulting sentence is produced as a modified sentence to be a part of the abstract at the step 133, and the process returns to the step 124 above.

It is to be noted that the distinct benefit of each of the logical structure memory 7, language analysis unit 8, and abstract modification unit 9 in the above embodiment can be obtained by incorporating just one of these elements without the other two, so that incorporation of all three as in the above embodiment is not absolutely necessary.

Figure 9D:
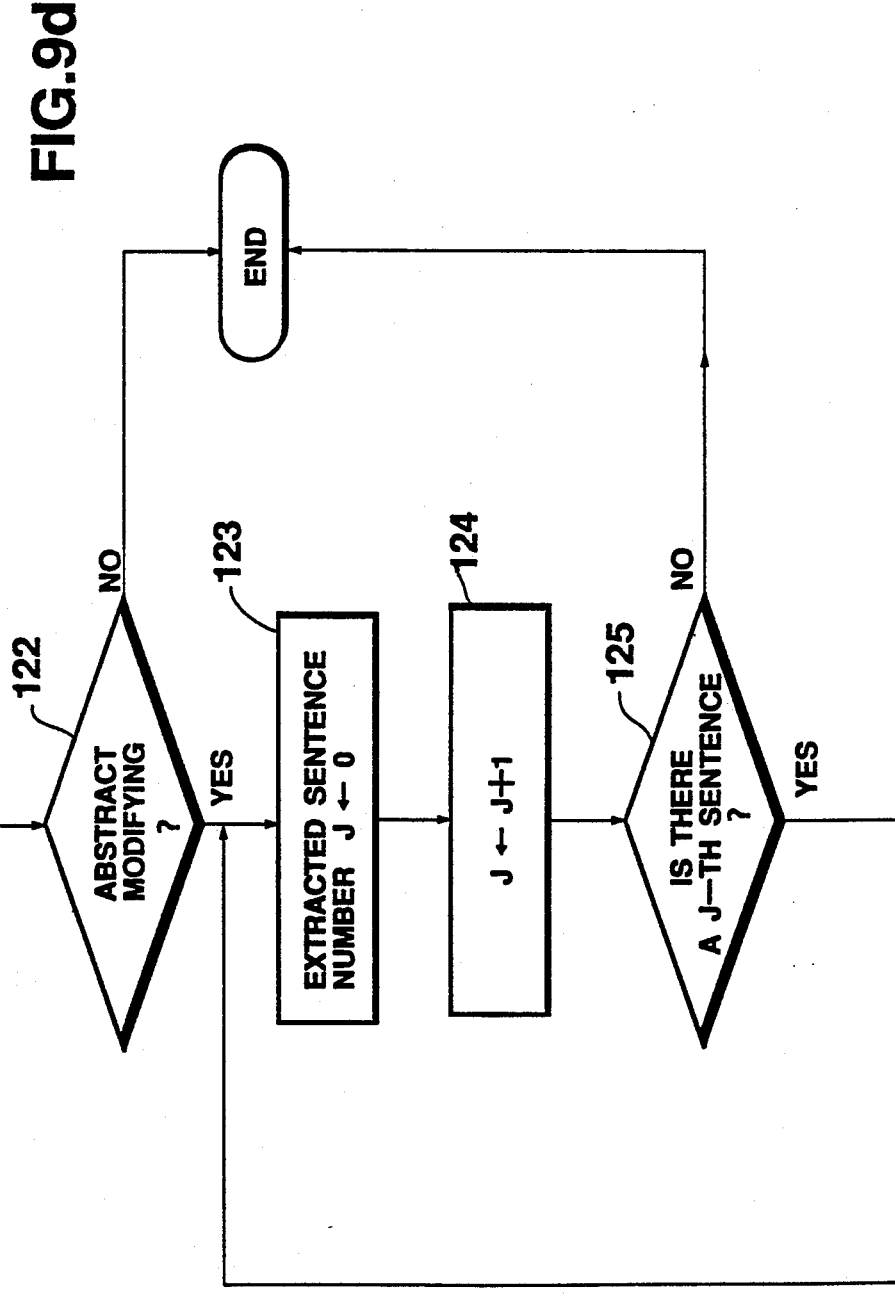
FIG. 9 is a schematic diagram showing the relationships of FIGS. 9a-9c.
FIGS. 9a-9c are a flow chart for the abstract production by the embodiment of FIG. 5.
Figure 9E:
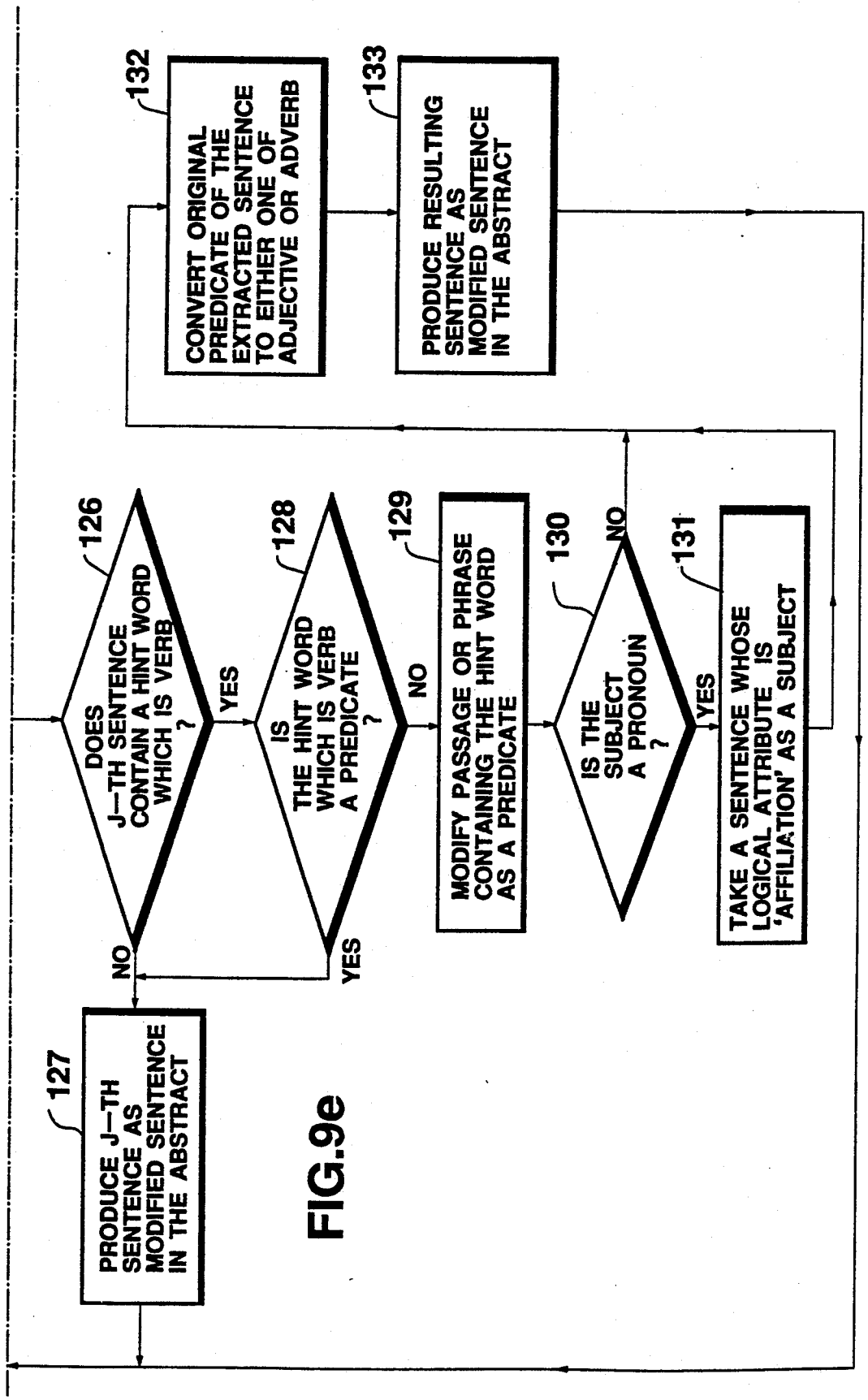

It can easily be seen from the above description that when the logical structure memory 7 is omitted, the steps 101–103, 110, and 116–121 in the flow chart of FIG. 9 can be omitted. Also, when the language analysis unit 8 is omitted, the steps 104–106, and 112–114 in the flow chart of FIG. 9 can be omitted. Similarly, when the abstract modification unit 9 is omitted, the steps 122–133 in the flow chart of FIG. 9 can be omitted.

Besides these, many modifications and variations of the above embodiments may be made without departing from the novel and advantageous feature of the present invention. Accordingly, all such modifications and variations are intended to be included within the scope of the appended claims.

What is claimed is:

1. A method of producing an abstract for a document, comprising the steps of:
   listing hint words which are preselected words indicative of presence of significant phrases that can reflect content of the document;
   searching all the hint words in the document;
   extracting sentences of the document in which any one of the listed hint words is found by the search; and
   producing an abstract for the document by juxtaposing the extracted sentences.

2. The method of claim 1, further comprising the step of listing structural attribute for each sentence of the document; and wherein the search of some of the hint words are performed for only a fraction of all the sentences of the document, in accordance with nature of the hint words and the structural attributes of the sentences.

3. The method of claim 1, further comprising the steps of:
   listing most preferable part of speech for each hint word; and
   morphologically analyzing the sentences of the document; and wherein the extraction of the sentences is limited to those sentences in which any one of the listed hint words that is found by the search is in the listed type of part of speech.

4. The method of claim 1, further comprising the step of modifying the extracted sentences such that for a hint word that is found with the listed type of part of speech which is a verb, a new sentence in which that hint word appears as a predicate will be created and replaces an original extracted sentence, while when a subject of the extracted sentence is a pronoun or missing, an appropriate sentence will be substituted for that pronoun, whereas for a hint word that is found with the listed type of part of speech which is a noun, a new sentence in which that hint word appears as a subject will be created and replaces the original extracted sentence.

5. The method of claim 1, further comprising the step of allowing an operator to edit the produced abstract.

6. An apparatus for producing an abstract for a document, comprising:
   means for listing hint words which are preselected words indicative of presence of significant phrases that can reflect content of the document;
   means for searching all the hint words in the document;
   means for extracting sentences of the document in which any one of the listed hint words is found by the search; and
   means for producing an abstract for the document by juxtaposing the extracted sentences.

7. The apparatus of claim 6, further comprising means for listing structural attribute for each sentence of the document; and wherein the search of some of the hint words are performed for only a fraction of all the sentences of the document, in accordance with nature of the hint words and the structural attributes of the sentences.

8. The apparatus of claim 6, further comprising:
   means for listing most preferable part of speech for each hint word; and
   means for morphologically analyzing the sentences of the document;
   and wherein the extraction of the sentences is limited to those sentences in which any one of the hint words listed that is found by the search is in the listed type of part of speech.

9. The apparatus of claim 6, further comprising means for modifying the extracted sentences such that for a hint word that is found with the listed type of part of speech which is a verb, a new sentence in which that hint word appears as a predicate will be created and replaces an original extracted sentence, while when a subject of the extracted sentence is a pronoun or missing, an appropriate sentence will be substituted for that pronoun, whereas for a hint word that is found with the listed type of part of speech which is a noun, a new sentence in which that hint word appears as a subject will be created and replaces the original extracted sentence.

10. The apparatus of claim 6, further comprising means for allowing an operator to edit the produced abstract.

* * * * *